US008260183B2

(12) United States Patent
Eichhorn et al.

(10) Patent No.: US 8,260,183 B2
(45) Date of Patent: Sep. 4, 2012

(54) SOFT PRESSURE ROLLER COMPOSITION FOR FUSING SYSTEM

(75) Inventors: Wade R. Eichhorn, Minneapolis, MN (US); Boris Avrushchenko, St. Louis Park, MN (US); Kristian G. Wyrobek, Minneapolis, MN (US); David Winters, Cottage Grove, MN (US)

(73) Assignee: 7-Sigma Incorporated, Minneapolis, MN (US)

( * ) Notice: Subject to any disclaimer, the term of this patent is extended or adjusted under 35 U.S.C. 154(b) by 772 days.

(21) Appl. No.: 12/154,269

(22) Filed: May 21, 2008

(65) Prior Publication Data

US 2009/0290918 A1 Nov. 26, 2009

(51) Int. Cl.
*G03G 15/20* (2006.01)
*F16C 13/00* (2006.01)

(52) U.S. Cl. .......................................... 399/333; 492/59

(58) Field of Classification Search .................. 399/331, 399/333, 339

See application file for complete search history.

(56) References Cited

U.S. PATENT DOCUMENTS

| | | | | |
|---|---|---|---|---|
| 4,229,950 | A | 10/1980 | Fessenden | |
| 4,952,782 | A | 8/1990 | Yokokawa et al. | |
| 5,331,385 | A * | 7/1994 | Ohtsuka et al. | 399/331 |
| 5,649,891 | A | 7/1997 | Kass et al. | |
| 5,659,848 | A | 8/1997 | Jeon | |
| 6,061,546 | A | 5/2000 | Sawamura et al. | |
| 6,363,613 | B1 | 4/2002 | Wolf et al. | |
| 6,440,048 | B1 | 8/2002 | Bleil et al. | |
| 6,458,063 | B2 * | 10/2002 | Kodama | 492/59 |
| 6,617,090 | B2 * | 9/2003 | Pickering et al. | 430/124.34 |
| 6,665,504 | B2 | 12/2003 | Lee et al. | |
| 6,785,503 | B2 | 8/2004 | Kuo et al. | |
| 6,804,478 | B2 | 10/2004 | Martin et al. | |
| 6,839,538 | B1 | 1/2005 | Gonzalez | |
| 7,014,976 | B2 * | 3/2006 | Pickering et al. | 430/124.35 |
| 2003/0063916 | A1 * | 4/2003 | Katayanagi et al. | 399/44 |
| 2007/0280754 | A1 * | 12/2007 | Ogawa et al. | 399/328 |

FOREIGN PATENT DOCUMENTS

| | | | |
|---|---|---|---|
| JP | 61231578 | A * | 10/1986 |
| JP | 63183475 | A * | 7/1988 |
| JP | 63186024 | A * | 8/1988 |
| JP | 04316075 | A * | 11/1992 |
| JP | 05323815 | A * | 12/1993 |
| JP | 11080669 | A * | 3/1999 |
| JP | 2001228736 | A * | 8/2001 |
| JP | 2002257130 | A * | 9/2002 |
| JP | 2003084540 | A * | 3/2003 |
| JP | 2003345158 | A * | 12/2003 |
| JP | 2004287275 | A * | 10/2004 |
| JP | 2007279165 | A * | 10/2007 |

* cited by examiner

*Primary Examiner* — David Gray
*Assistant Examiner* — Gregory H Curran
(74) *Attorney, Agent, or Firm* — Patterson Thuente Christensen Pedersen, P.A.

(57) ABSTRACT

A soft pressure roller for use in a printer fusing system having an inside diameter and an outside diameter, wherein the roller is fabricated of LIM silicone elastomer having a softness of between 15 and 35 Asker C and wherein the distance between the inside diameter and the outside diameter is between 2 mm and 10 mm.

4 Claims, 8 Drawing Sheets

| Material | Hardness, Shore A | Softness, Asker C | Compression Set, % | Tensile, psi | Elongation, % |
|---|---|---|---|---|---|
| HCR Silicone | 30 - 60 | N/A | 10-20 | 700 - 900 | 300 - 500 |
| LIM hard Silicone | 30 - 50 | N/A | 10 - 20 | 180 - 200 | 100 - 200 |
| LIM soft Silicone | N/A | 25-35 | 10 - 15 | 80 - 100 | 100 - 200 |
| Silicone foam | N/A | 45 - 50 | 50-55 | N/A* | N/A* |
| *Soft material needed | N/A | 15-18 | < 8 | > 150 | > 400 |

FIG. 4

| Roller made from | Sleeve thickness, μ | Rubber wall thickness, mm | Composite hardness, Asker C |
|---|---|---|---|
| LIM hard Silicone | 110 | 4.0 | 80 |
| LIM soft Silicone | 50 | 1.5 | 75 - 80 |
| Silicone foam | 30 | 2.5 | 53 - 55 |

FIG. 7

| Wall thickness, mm | Sleeve thickness, μ | Composite hardness, Asker C |
|---|---|---|
| 2.5 | 40 | **53** |
| 7.5 | 40 | **45** |
| 10 | 40 | **30** |
| 2.5 | N/A | **33** |
| 7.5 | N/A | **22** |
| 10 | N/A | **18** |

FIG. 8

SOFT PRESSURE ROLLER COMPOSITION FOR FUSING SYSTEM

FIELD OF THE INVENTION

The invention relates to a soft pressure roller for use in a printer fusing station. More particularly, the invention relates to a roller having an elastomer composition which provides low composite hardness, very low compression set, and extended life over that of current soft pressure rollers used for printer fusing application.

BACKGROUND OF THE INVENTION

Laser printers and other electrophotographic image forming devices for both black-and-white and color printing technologies use toner particles to form a desired image on print media. The print media is often paper, although a wide variety of different print media may be employed. Once the toner is applied to the media, the media is advanced along a media path to a thermal fuser. In some image forming devices, the fuser includes a fuser roller and a mating pressure roller. As the media passes between the fuser roller and the pressure roller, the toner is fused to the media through a process using pressure and heat exceeding 300° F. (148° C.).

The interference area between the fuser roller and the pressure roller is often referred to as the nip. It is desirable to maintain a substantially uniform pressure in the nip. Uneven, or non-uniform pressure may result in degraded print quality, wrinkled print media, or other undesirable consequences.

Therefore, it is desirable to develop a roller composition that provides low composite hardness, low compression set, and extended life over that of current soft pressure rollers used for printer fusing application.

SUMMARY OF THE INVENTION

NIP formation is created by the intersection of two members under load. The resulting pressure under the nip width formed is an important function to obtain a properly fused image in the printing process. One of the members of the nip fusing systems is a pressure roller. The pressure roller deforms, under load, to create a contact region where pressure and temperature fuse the toner image to the substrate as it passes through the nip region.

A pressure roller is used with another roller or a belt to form the nip region. The amount of pressure and heat that is generated is determined by the design of the fusing system, which is dependent upon the speed of the printer, toner properties, etc. The amount of pressure needed to form the desired nip region is proportional to the composite hardness of the pressure roller.

The hardness or softness of a pressure roller is dependent upon the base material. Critical physical parameters of the material chosen are the hardness, measured in Shore A for harder materials and Asker C for soft materials, compression set expressed in % of permanent deformation, elongation expressed in % of deformation, and tensile strength given in pounds per square inch (psi). Other important properties are dynamic responses under temperature (° C.), pressure, and aging, which also affect roller life performance.

The designs of pressure rollers used in nip forming fusing systems employ a single polymer material on a core or multiple layer configurations. Often fluoropolymer sleeves are bonded to a material for enhanced toner release and wear resistance. When a roller is designed using multiple layers of different polymers, the total hardness, or composite hardness, is a measure of the deformation capability of the roller under pressure. Selection of base materials are chosen from silicone, EPDM, fluorocarbon, and other elastomer polymers. Furthermore, foam structures of these same materials may be utilized, often to achieve a lower composite hardness. The most common polymers are classified as a high consistence elastomer (HCR), a liquid injection material (LIM), a room temperature vulcanized elastomer (RTV), or a foam version of each that incorporates air pockets or voids.

To achieve a roller of very low hardness, physical properties of materials, such as compression set are often compromised, thus contributing to failure modes which affect the performance and or life of the roller in a fusing system environment.

Compression set of a material is critical in fusing system applications and is therefore desired to be as low as possible, less than 10%. Greater compression set introduces issues of loss of nip over time and elevated temperatures. This is one of the issues associated with foam materials, which have a compression set of 50%, but which are often a choice for low hardness pressure rollers. Tensile strength and elongation of materials are values that indicate the strength of a material under pressure in the fusing nip. Accordingly, a material with higher tensile strength and elongation is preferred.

Dynamic properties testing of materials, such as Dynamic Modulus Analysis (DMA) at temperature is a test which indicates the stability of a material to continuous deformation of nip fusing environment. Values from these tests are often considered in the choice of materials suitable for nip formation applications in fusing environments. In general the formulation or chemistry of a polymer that gives the desired softness, may give low physical properties such that the tensile and elongation are very low. This may result in deformation or destruction of the roller under nip forming pressure and thus decreasing the life of the roller. Therefore, a material with the greater tensile and elongation properties is generally preferred. The choice of the materials, and the construction thereof, is critical in the design of the pressure roller.

In view of the foregoing, the pressure roller of the present invention provides a very low composite softness and very low compression set, exhibiting the physical and dynamic properties of a true elastomer. These enhanced properties of the invention result in optimized fusing system parameters, temperature stability and increased life of the roller in printing applications.

The present invention encompasses a pressure roller with a silicone wall thickness between 2 mm and 10 mm having a composite softness of between 15 and 35 Asker C, and a compression set of less than 10%. The present invention also encompasses a pressure roller with a silicone wall thickness between 2 mm and 10 mm having a multilayer construction with a composite hardness between 17 and 60 Asker C.

In another embodiment, the invention includes a pressure roller having a core and a base. The base has an inside diameter and an outside diameter, wherein the inside diameter is molded about the core. The roller is fabricated of a LIM silicone elastomer having a softness of between 15 and 35 Asker C and the distance between the inside diameter and the outside diameter is between 2 mm and 10 mm.

In yet another embodiment, the invention includes a pressure roller having a core and a base. The base has an inside diameter and an outside diameter, wherein the inside diameter is molded about the core. The roller is fabricated of a LIM silicone elastomer having a softness of between 15 and 35 Asker C and the distance between the inside diameter and the outside diameter is between 2 mm and 10 mm. A top coat is disposed about the entire outside diameter. The top coat is fabricated of a polymer having abrasion resistance and surface release properties with a softness between 17 and 40 Asker C.

In an alternative embodiment, the invention includes a pressure roller having an inside diameter and an outside diameter. The roller is fabricated of LIM silicone elastomer having a softness of between 15 and 35 Asker C and the distance between the inside diameter and the outside diameter is between 2 mm and 10 mm. A sleeve having a thickness defined by an interior and an exterior is disposed about the entire outside diameter. The sleeve is fabricated from a fluoropolymer having a thickness of the sleeve is between 20 and 50 microns.

In yet another alternative embodiment, the invention includes a pressure roller having a core and a base. The base is defined by a layer of LIM silicone elastomer having an inside diameter and an outside diameter. The layer of LIM silicone includes a softness of between 15 and 35 Asker C and the distance between the inside diameter and the outside diameter is between 2 mm and 10 mm. The pressure roller also includes a sleeve having a thickness defined by an interior and an exterior. The interior of the sleeve is disposed about the base. The sleeve is fabricated from a fluoropolymer having a thickness between 20 and 50 microns. The composite hardness of the roller is between 20 and 60 Asker C.

BRIEF DESCRIPTION OF THE DRAWINGS

FIG. 4 is a table of physical properties of various materials commonly used for pressure roller composition and that of present invention.

FIG. 7 is a table of composite hardness of various pressure roller compositions.

FIG. 8 is a table of composite hardness for pressure rollers embodied in the present invention.

DETAILED DESCRIPTION OF THE DRAWINGS

Figure 1:
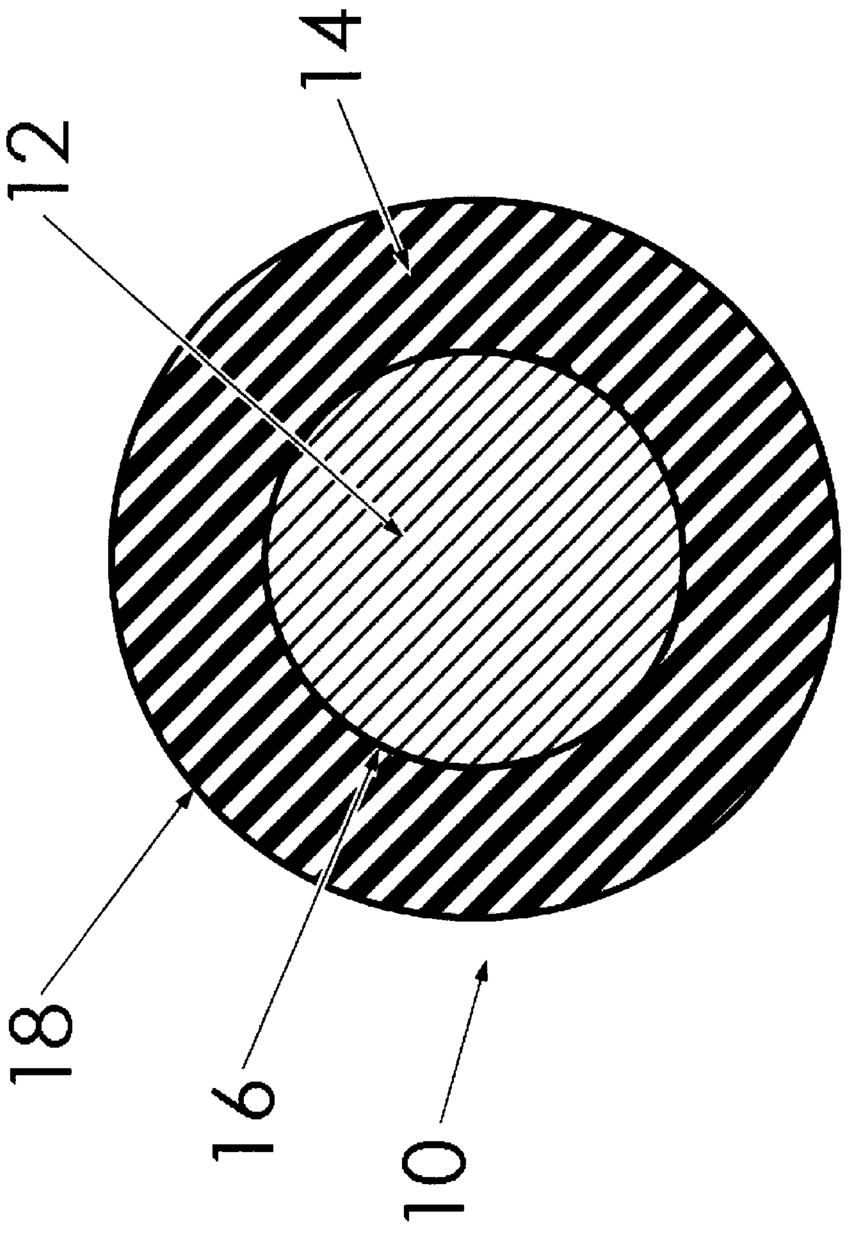
FIG. 1 is a cross sectional view of a pressure roller according to the present invention.
Figure 2:
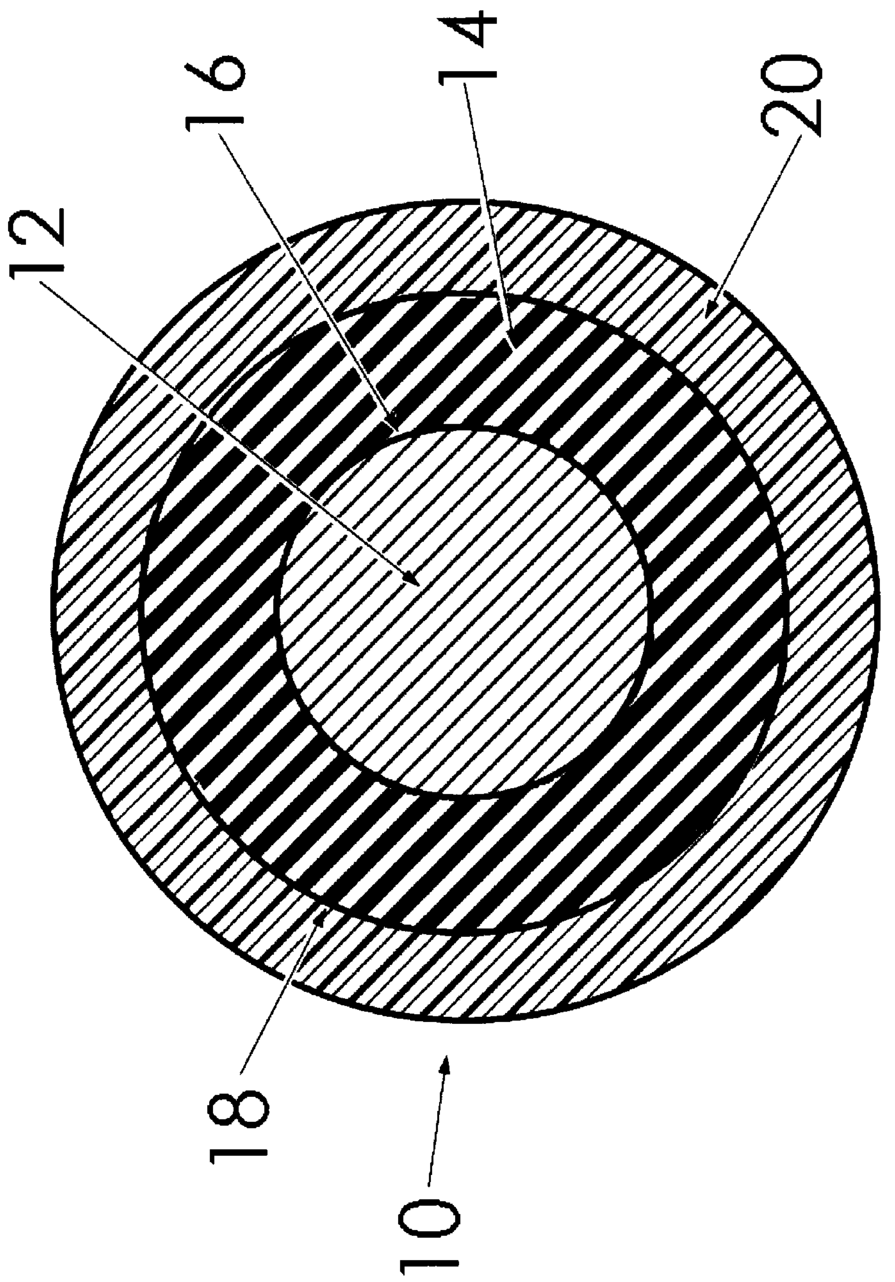
FIG. 2 is a cross sectional view of an alternative embodiment of a pressure roller according to the present invention.
Figure 3:
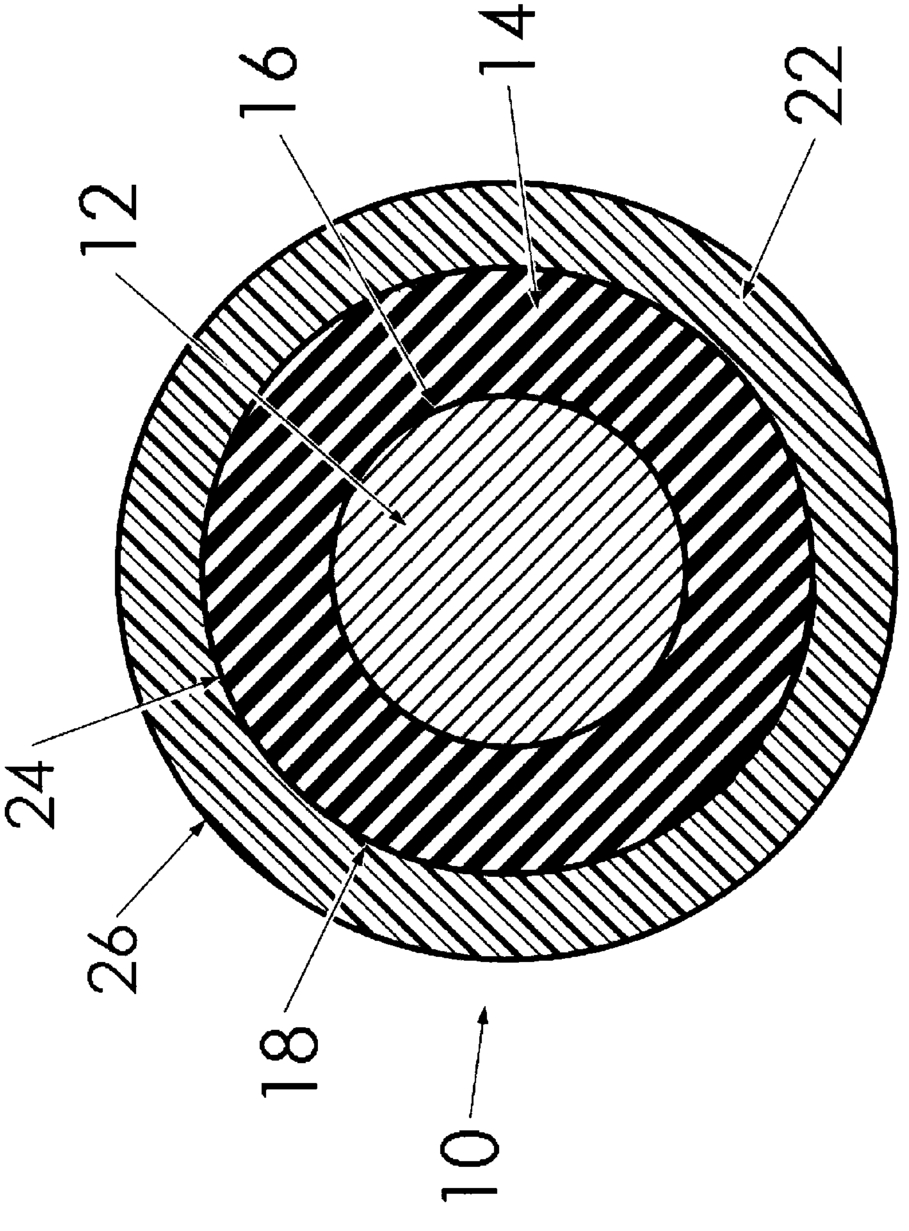
FIG. 3 is a cross sectional view of another alternative embodiment of a pressure roller according to the present invention.

The present invention encompasses a pressure roller design in which the composite hardness of the roller is between 15 and 60 Asker C, having a compression set of less than 10% and a base material minimum elongation property of 400%. FIGS. 1, 2 and 3 show configurations of pressure roller compositions, meeting softness and compression set parameters, which may be used in the design of a soft pressure roller for fusing applications.

With reference to FIG. 1, the details of one embodiment of the pressure roller 10 will now be discussed. FIG. 1 shows a cross-sectional view of pressure roller 10. Pressure roller 10 includes a core 12 and base 14. Base 14 is molded around core 12 and is defined by an inside diameter 16 and an outside diameter 18. Base 14 is fabricated of LIM silicone elastomer. The LIM silicone elastomer material has a softness of between 15 and 35 Asker C. The distance between inside diameter 16 and outside diameter 18 is between 2 mm and 10 mm. In one embodiment, pressure roller 10 has a compression set of less than 10%. In another embodiment, the LIM silicone elastomer has a compression set of less than 10%, a minimum elongation of 400%, and a minimum tensile strength of 150 psi.

FIG. 2 shows a cross-sectional view of an alternative embodiment of the pressure roller 10 of the present invention. Pressure roller 10 includes a core 12 and base 14. Base 14 is molded around core 12 and is defined by an inside diameter 16 and an outside diameter 18. Base 14 is fabricated of LIM silicone elastomer. The LIM silicone elastomer material has a softness of between 15 and 35 Asker C. The distance between inside diameter 16 and outside diameter 18 is between 2 mm and 10 mm. In one embodiment, pressure roller 10 has a compression set of less than 10%. In another embodiment, the LIM silicone elastomer has a compression set of less than 10%, a minimum elongation of 400%, and a minimum tensile strength of 150 psi. Top coat 20 is disposed about the entire outside diameter 18 of base 14. Top coat 20 is fabricated of a polymer having abrasion resistance and surface release properties with a softness of between 17 and 40 Asker C.

With respect to FIG. 3, another alternative embodiment of the pressure roller 10 will be discussed. FIG. 3 shows a cross-sectional view of an alternative embodiment of the pressure roller 10 of the present invention. Pressure roller 10 includes a core 12 and base 14. Base 14 is molded around core 12 and is defined by an inside diameter 16 and an outside diameter 18. Base 14 is fabricated of LIM silicone elastomer. The LIM silicone elastomer material has a softness of between 15 and 35 Asker C. The distance between inside diameter 16 and outside diameter 18 is between 2 mm and 10 mm. In one embodiment, pressure roller 10 has a compression set of less than 10%. In another embodiment, the LIM silicone elastomer has a compression set of less than 10%, a minimum elongation of 400%, and a minimum tensile strength of 150 psi. Pressure roller 10 further includes a sleeve 22 defined by an interior 24 and an exterior 26, wherein the interior 24 of the sleeve 22 is disposed about the entire outside diameter 18 of base 14. Sleeve 22 is fabricated from a fluoropolymer base. Sleeve 22 includes a thickness that is defined by the distance between interior 24 and exterior 26. The thickness of the sleeve 22 is between 20 and 50 microns. The composite hardness of the pressure roller 10 is between 20 and 60 Asker C.

Figure 5:
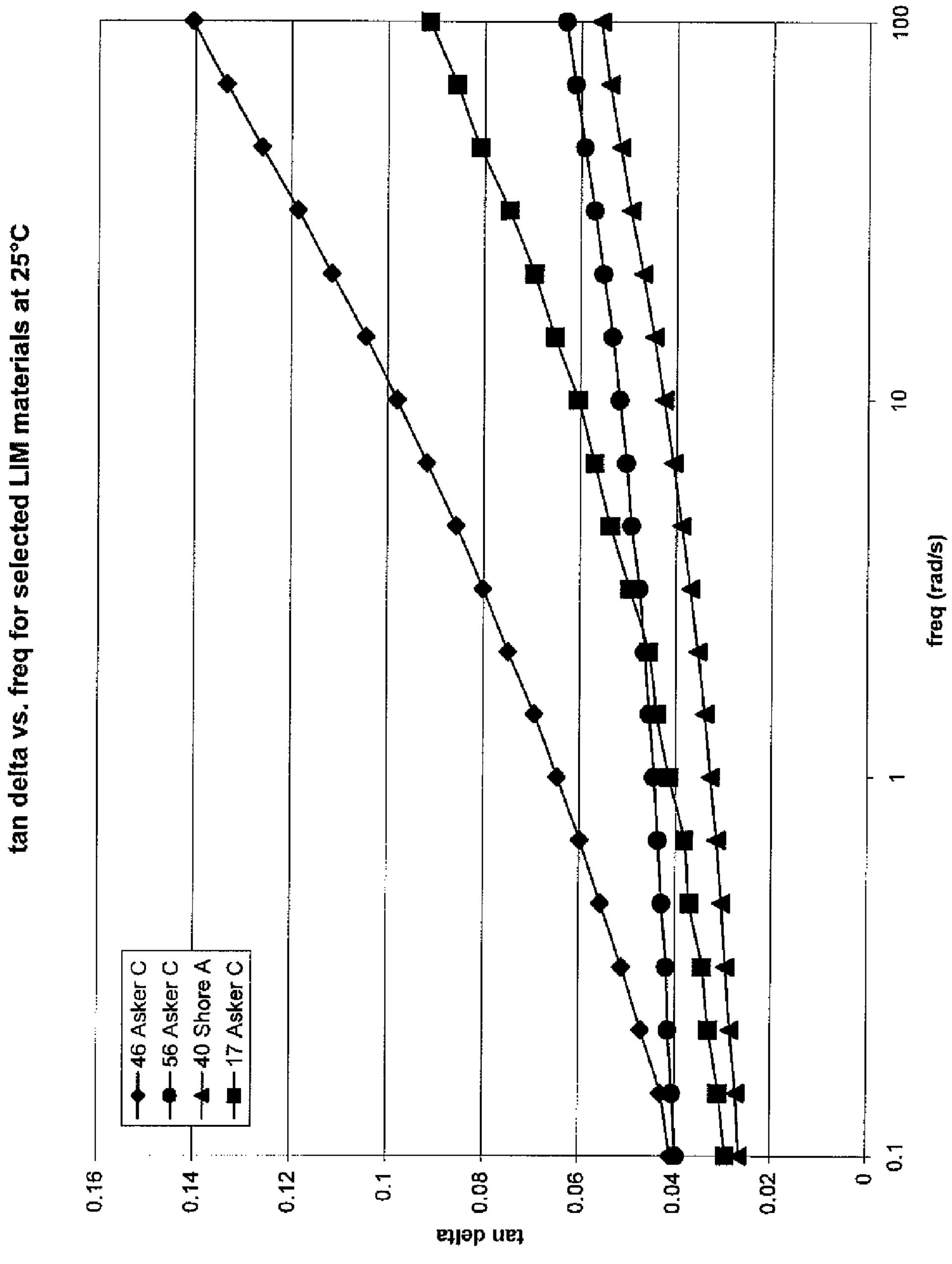
FIG. 5 is a graph of test results showing the tan delta of LIM elastomers at room temperature.
Figure 6:
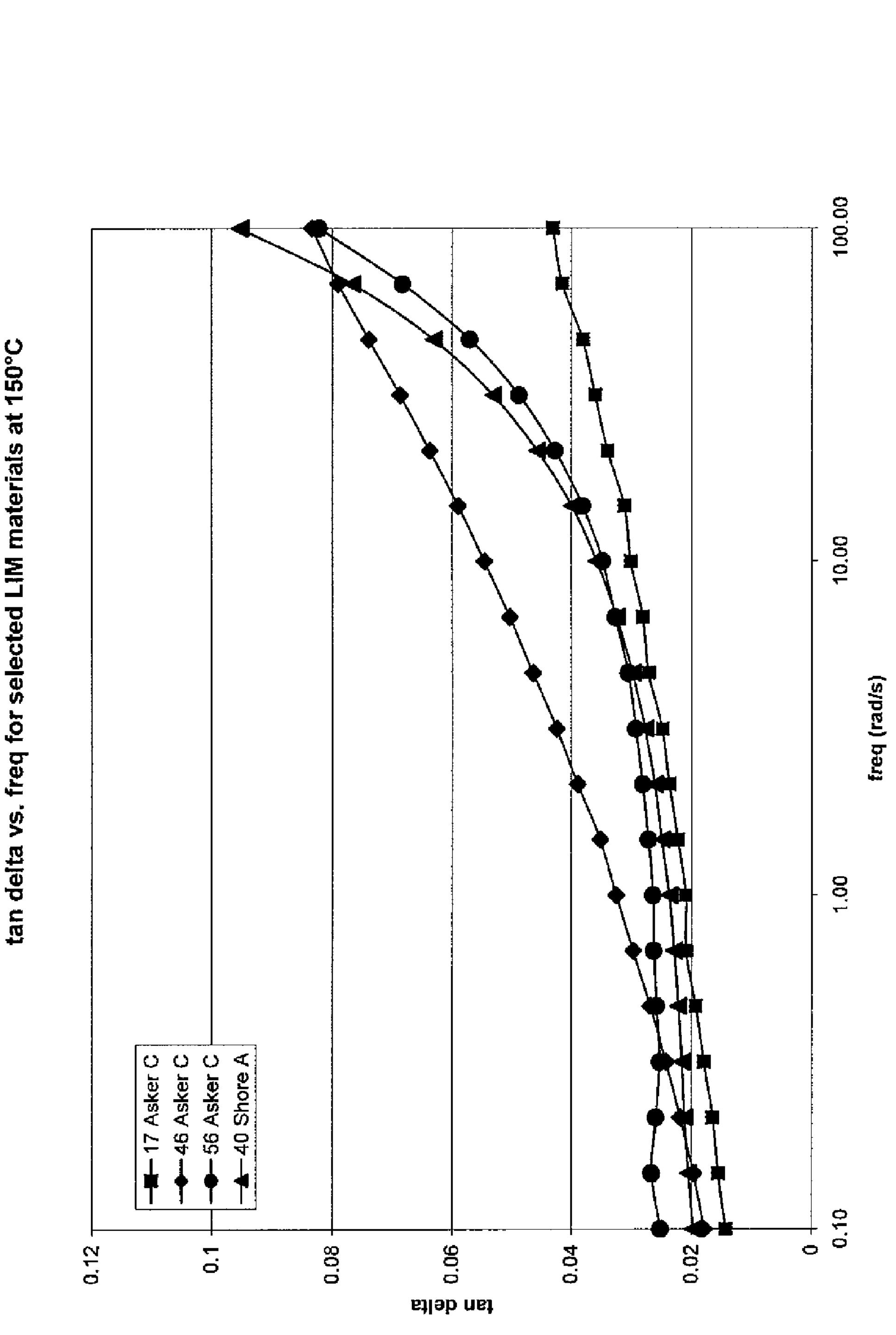
FIG. 6 is a graph of test results showing the tan delta of the LIM elastomers of FIG. 5 at a temperature of 150° C.

FIG. 4 is a table of physical properties of various pressure roller materials showing the hardness and other physical properties important for pressure roller composition. The present invention incorporates the properties given in FIG. 4 designated as the “soft material needed”. FIG. 5 and FIG. 6 show the dynamic response of materials one may use in pressure roller applications as a measure of tan delta. The tan delta (tan δ) of a material is defined as the ratio of the loss modulus, (G") to the storage modulus (G'), and is a measure of the damping ability of the material when subjected to a sinusoidal deformation. When a material is deformed, energy is stored within the material due to stress being placed on it. When the deformation is removed, the energy is released mostly as heat. This occurs at a predetermined frequency range and temperature. The less energy released, the lower the G" value, and thus the lower the tan δ. The lower the tan δ is at elevated temperatures, the more thermally stable the material is. Accordingly, materials with a lower tan δ are generally a better choice. A base material with low tan δ, with softness of less than 18 Asker C, and with a compression set of less than 10%, is the configuration of one embodiment of the invention.

The composite hardness of various pressure roller compositions is given in FIG. 7 and FIG. 8. FIG. 7 shows examples of LIM silicone pressure rollers commonly used in fusing system application. It is noted that these compositions do not meet the embodiment of this invention, in particular composite hardness and compression set values in FIG. 4. FIG. 8 shows the composite hardness of LIM silicone pressure rollers embodied in the present invention. These rollers meet the composition designs of FIGS. 1, 2, and 3, and the claims of this invention.

The rollers of the preferred embodiment have base elastomer material with physical properties given in FIG. 4 identified as "soft material needed", and having dynamic properties shown in FIGS. 5 and 6 as "17 Asker C". These properties distinguish the pressure rollers of this invention from a foam pressure roller with similar composite softness, in the region of 53 Asker C, by having a compression set value which is more than five times less than a foam roller of similar construction. Thus the present invention encompasses a pressure roller with a silicone wall thickness between 10 mm and 2 mm having a composite softness of 15 and 35 Asker C, and a compression set of less than 10%. The present invention also encompasses a pressure roller with a silicone wall thickness between 10 mm and 2 mm having a multilayer construction with a composite hardness between 20 and 60 Asker C and a compression set of less than 10%.

The invention claimed is:

1. A pressure roller comprising:

a core, and;

a base having an inside diameter and an outside diameter, wherein the inside diameter is molded about the core and wherein the roller is fabricated of a LIM silicone elastomer having a softness of between 15 and 19 Asker C and wherein the distance between the inside diameter and the outside diameter is between 2 mm and 10 mm, and wherein the LIM silicone elastomer has a compression set of less than ten percent, a tensile strength of greater than one hundred fifty pounds per square inch and an elongation of greater than four hundred percent wherein the base forms an outermost surface of the pressure roller.

2. A pressure roller consisting of:

a core and a base, wherein the base is defined by a layer of LIM silicone elastomer having an inside diameter and an outside diameter, wherein the layer of LIM silicone has a softness of between 15 and 19 Asker C, and wherein the distance between the inside diameter and the outside diameter is between 2 mm and 10 mm wherein the LIM silicone elastomer has a compression set of less than ten percent, a tensile strength of greater than one hundred fifty pounds per square inch and an elongation of greater than four hundred percent; and a top coat disposed about the entire outside diameter of the base, wherein the top coat is fabricated of a polymer having abrasion resistance and surface release properties with a softness between 17 and 40 Asker C.

3. A pressure roller consisting of:

a core and a base, wherein the base is defined by a layer of LIM silicone elastomer having an inside diameter and an outside diameter, wherein the layer of LIM silicone includes a softness of between 15 and 19 Asker C wherein the LIM silicone elastomer has a compression set of less than ten percent, a tensile strength of greater than one hundred fifty pounds per square inch and an elongation of greater than four hundred percent, and wherein the distance between the inside diameter and the outside diameter is between 2 mm and 10 mm; and a sleeve having a thickness defined by an interior and an exterior, wherein the interior of the sleeve is disposed about the base, wherein the sleeve is fabricated from a fluoropolymer wherein the thickness of the sleeve is between 20 and 50 microns and the composite hardness of the sleeve is between 20 and 60 Asker C.

4. A pressure roller consisting of:

a core, and;

a base having an inside diameter and an outside diameter, wherein the inside diameter is molded about the core and wherein the roller is fabricated of a LIM silicone elastomer having a softness of between 15 and 19 Asker C and wherein the distance between the inside diameter and the outside diameter is between 2 mm and 10 mm wherein the LIM silicone elastomer has a compression set of less than ten percent, a tensile strength of greater than one hundred fifty pounds per square inch and an elongation of greater than four hundred percent.

* * * * *